Sept. 28, 1954     M. E. STEEVES     2,690,461

NONSKID VEHICLE TIRE AND METHOD FOR MAKING SAME

Filed Sept. 26, 1947

INVENTOR.
MARTIN E. STEEVES
BY William Cleland
Attorney

Patented Sept. 28, 1954

2,690,461

UNITED STATES PATENT OFFICE 2,690,461

NONSKID VEHICLE TIRE AND METHOD FOR MAKING SAME

Martin E. Steeves, Akron, Ohio

Application September 26, 1947, Serial No. 776,189

5 Claims. (Cl. 260—729)

This invention relates to non-skid tires and methods for producing the same.

In the past many attempts have been made to provide rubber tires with relatively large inserts of various kinds in the tread rubber thereof designed to resist abrasion to a greater extent than said tread rubber, and thus provide a non-skid effect, abrasion-resistance has thus been regarded in the prior art as a measure of skid-resistance; these terms, however, are not synonymous since they refer to independent functions, the first being a property of a material per se measured by the extent of loss of material under pressure-grinding and the second a surface phenomenon varying with the nature of two materials in pressure-contact and measured by the coefficient of friction. Provision of such inserts, however, whether of metal, soft rubber, or other material has not been practical because of obvious difficulties encountered in fabricating a tire with the large number of such inserts required therein for effective non-skid results. Moreover, a difficult problem is presented with respect to adhesion of the inserts to the rubber body of the tire, and this is particularly true when the insert is of metal or other hard material which naturally resists bonding to rubber. Also that hardness is not necessarily a controlling factor is shown by the fact that steel inserts may be ineffective because they tend to wear down faster than the tread rubber due to the greatly improved toughness of the present day tread rubbers; and other hard substances suggested by the prior art may be similarly objectionable.

While thus neither abrasion-resistance nor hardness are necessarily measures of skid-resistance, it has been found that surprisingly effective skid-resistance can be imparted to tread rubbers, particularly when in contact with wet surfaces and this without objectionably affecting their durability and resiliency, through the incorporation of discrete portions or particles of irresilient "hard" rubber in the "tread" rubber before vulcanization of the latter, as these terms are commonly understood in the art and hereinafter defined. What is more, an integral bonding of the two kinds of rubbers occurs under heat of vulcanization without any well-defined interfacings, so that the hard rubber particles become integral with and inseparable from the tread rubber matrix. In addition the invention provides a non-skid tire which may be produced without materially affecting the methods or procedures normally followed in producing an ordinary tire, or requiring any substantial modification of standard tire fabricating equipment.

Further in addition, the invention provides an improved tire which will have desired non-skid means incorporated in the usual tread rubber thereof without affecting the usual desired structural shape or the tread design configurations.

These and other objects of the invention will be manifest from the following brief description and the accompanying drawings.

Figure 1:
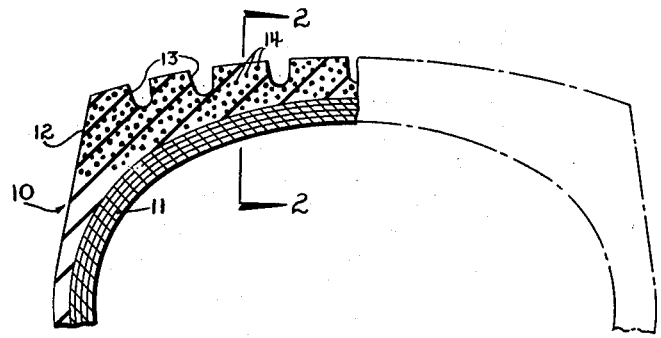
Figure 1 is a transverse section, partly in full and partly in chain-dotted lines, of a pneumatic tire embodying the features of one form of the invention.
Figure 2:
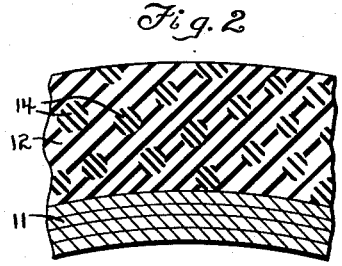
Figure 2 is an enlarged fragmentary cross-section, taken substantially on the line 2—2 of Figure 1.

Referring particularly to Figures 1 and 2 there is shown a pneumatic tire 10 of the usual type having a rubberized fabric casing 11 and annular tread body or layer 12, which may have grooving 13 formed by a vulcanizing mold (not shown) to define a suitable non-skid tread design. The tread body 12 is of what may be termed relatively soft or semi-hard rubber, or synthetic elastomer for desired resiliency combined with maximum resistance to abrasive wear in normal use of the tire. The non-skid tread design of the ordinary tire is often partly or wholly inadequate to prevent skidding of a vehicle provided with such tires on relatively smooth or slippery surfaces. The present invention has for its principal aim to provide requisite non-skid means either replacing or supplementing the molded non-skid design projections or configurations.

Accordingly the relatively soft tread rubber layer 12 has incorporated therein discrete particles 14 of hard rubber (ebonite). The general size of the particles approximates that of a grain of sand and the spacing thereof is such as to provide maximum non-skid without materially affecting the desired cushioning resiliency of the tread rubber body, somewhat as shown in the drawings.

The particles 14 may be integrally bonded into the thread rubber 12 in a number of ways. For example, by one method either unvulcanized or partially vulcanized hard rubber is ground (as in the case of partially cured rubber) or otherwise reduced to desired particle size and mixed with the batch of unvulcanized tread rubber stock, in a mill of known type. If necessary the particles may be added to the batch after it has attained desired plasticity. The milled stock, with the particles 14 uniformly dispersed therein, is removed from the mill in sheets which, by known methods, are reworked and extruded from an extruding machine as continuous material of predetermined cross-sectional shape. Lengths of the extruded stock are built onto tire casings 11 to be integrally molded in the usual tire vulcanizing molds, to provide the tread bodies 12 of the tires, as best shown in Figure 1.

The last-mentioned step effects complete vulcanization of the tread body, with the resulting hard rubber particles 14 chemically bonded or fused to the softer semi-hard tread rubber. By nature of vulcanization of rubber the tread body becomes a one-piece structure without well-defined interfacing between the discrete portions and the tread rubber. In place of hard rubber, the particles may be of equivalent material having requisite capacity to fuse or bond chemically with the tread stock under heat of vulcanization, materials suitable for this purpose being synthetic elastomers, and certain synthetic resins which will copolymerize with rubber.

As a variation of the above process, a quantity of particles 14 of hard rubber or other hard thermo-plastic or thermo-setting material is provided as in the manner previously described, and mixed in rubber cement or like liquid adhesive to provide coatings of the adhesive thereon. The coated particles are then mixed with the soft rubber batch and the process is otherwise continued as before. Through the agency of the rubber cement, which is also vulcanizable, heat of vulcanization is effective to provide a desirably firm bond between the discrete particles 14 and the softer rubber of the tread body. As another alternative method, uncoated particles 14 of rubber or synthetic elastomer may be added to the tread rubber subsequent to or simultaneous with addition of a quantity of rubber cement to the soft rubber tread batch.

Figure 3:
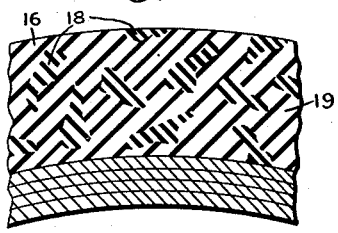
Figure 3 is a fragmentary cross-section, similar to Figure 2, illustrating a modified form of the invention.

In the form of the invention illustrated in Figure 3 the tread layer 16 of tire 17 comprises sections of two kinds of rubber, natural or synthetic, the portions or particles 18 of which are of hard rubber integrally united by vulcanization within a larger proportion of relatively soft or semi-hard tread rubber matrix 19. This composite tread body material may be produced by milling two separate batches of unvulcanized rubber having different or different amounts of vulcanizing accelerators, or other ingredients of rubber compositions, affective under heat of vulcanization to provide different degrees of resiliency characteristic of hard and tread rubbers in the respective portions 18 and 19 of the finished tread body.

Because the purpose of a tire tread is to protect the parts beneath it and must resist very severe wear and tear in service, it must age well and have maximum resistance to abrasion, tear, cracking, chipping and heat, all of which call for so-called "tread rubber" having high tensile strength, rather high modulus, and good elongation. Tread rubber of the conventional tire, therefore, is semi-hard and while satisfactory for general use without non-skid aids other than the usual non-skid configurations or buttons, is not completely satisfactory for service on icy pavements, for example. This problem is solved in the present invention by provision of discrete particles of "hard rubber" in the semi-hard "tread rubber" to provide sharp non-skid edges to icy surfaces. According to "The Vanderbilt 1942 Rubber Handbook," page 137, "hard rubber" (otherwise known as ebonite) as expressed herein and as commonly understood in the rubber industry, means a hard, tough, material which is elastic and flexible to a relatively slight degree. High grade hard rubber is black and capable of being given a hard lustre which distinguishes it from similar materials in appearance, and it differs from ordinary tread rubber in containing a much greater percentage of sulphur. It is well known, for instance, that "hard rubber" or "ebonite" contains a range of from 35 to 47 parts of sulphur combined with 100 parts of rubber hydrocarbon, as compared with "tread rubber" compounds which contain an average of 3 parts of sulphur to 100 parts of rubber hydrocarbon. During vulcanization of the tire, therefore, sulphur from the hard rubber particles tend to migrate to the tread rubber stock and the result is a complete integral bonding of the two kinds of rubber into a unitary tread body.

The reference to rubber in the claims means natural or synthetic rubber.

Further modifications of the invention may be resorted to without departing from the spirit thereof or the scope of the appended claims.

What is claimed is:

1. Tire tread surfacing comprising in the vulcanized state a matrix of resilient tread rubber characterized by a low sulfur content of the order of about three parts of sulfur to one hundred parts of the rubber hydrocarbon, and discrete particles of irresilient hard rubber characterized by a sulfur content of several times that of the tread rubber and ranging upward to about forty-seven parts to one hundred parts of the rubber hydrocarbon in admixture with said matrix; said particles being of a size comparable to grains of sand and being chemically bonded to the matrix without well-defined interfacings between the discrete hard particles and the tread rubber matrix.

2. A tire tread rubber surfacing comprising in the vulcanized state a matrix of resilient, low sulfur content tread rubber and discrete particles of a relatively irresilient, high sulfur content hard rubber incorporated in said matrix; said particles being bonded to the matrix without well-defined interfacings between the discrete particles and the matrix.

3. A tire tread rubber surfacing comprising in the vulcanized state a matrix of resilient, low sulfur content tread rubber and discrete particles of a relatively irresilient, high sulfur content hard rubber incorporated in said matrix.

4. Process of preparing a tire tread rubber surfacing which comprises incorporating into an unvulcanized low sulfur content tread rubber discrete particles of a rubber composition of relatively high sulfur content characterizing hard rubber; and subjecting the mass so prepared to heat of vulcanization to cause a chemical bonding between the two rubbers into a structure of relatively irresilient particles in a resilient matrix.

5. Process according to claim 4 in which the particles when added are vulcanizable.

References Cited in the file of this patent

UNITED STATES PATENTS

| Number | Name | Date |
|---|---|---|
| 1,088,845 | Stromeyer | Mar. 3, 1914 |
| 1,290,576 | Kendall | Jan. 7, 1919 |
| 1,668,476 | Westcott | May 1, 1928 |
| 1,973,748 | Caldwell | Sept. 18, 1934 |
| 2,084,784 | Stahl | June 22, 1937 |
| 2,171,438 | Tarbox | Aug. 29, 1939 |
| 2,253,608 | Bruce | Aug. 26, 1941 |
| 2,457,097 | Grotenhuis | Dec. 21, 1948 |

FOREIGN PATENTS

| Number | Country | Date |
|---|---|---|
| 383,962 | Great Britain | Nov. 24, 1932 |